(12) United States Patent
Hsu et al.

(10) Patent No.: US 12,120,213 B2
(45) Date of Patent: Oct. 15, 2024

(54) 100BASE-TX TRANSCEIVER WITH TRANSMIT CLOCK SELECTED FROM OUTPUT CLOCK OF CLOCK GENERATOR CIRCUIT AND RECEIVE RECOVERED CLOCK OF CLOCK AND DATA RECOVERY CIRCUIT AND ASSOCIATED METHOD

(71) Applicant: Airoha Technology Corp., Hsinchu (TW)

(72) Inventors: Chia-Hsing Hsu, New Taipei (TW); Chun-Chia Huang, Hsinchu (TW)

(73) Assignee: Airoha Technology Corp., Hsinchu (TW)

( * ) Notice: Subject to any disclaimer, the term of this patent is extended or adjusted under 35 U.S.C. 154(b) by 60 days.

(21) Appl. No.: 18/073,528

(22) Filed: Dec. 1, 2022

(65) Prior Publication Data

US 2023/0388099 A1    Nov. 30, 2023

Related U.S. Application Data

(60) Provisional application No. 63/346,907, filed on May 30, 2022.

(51) Int. Cl.
*H04J 3/06*    (2006.01)
*H04L 7/00*    (2006.01)

(52) U.S. Cl.
CPC .......... *H04L 7/0079* (2013.01); *H04J 3/0688* (2013.01)

(58) Field of Classification Search
CPC ........................... H04L 7/0079; H04J 3/0688
See application file for complete search history.

(56) References Cited

U.S. PATENT DOCUMENTS

| 8,724,680 | B2* | 5/2014 | Hsu | ..................... H04L 12/6418 |
| | | | | 375/373 |
| 9,191,190 | B2* | 11/2015 | Ma | ....................... H04B 1/0475 |
| 10,505,808 | B1 | 12/2019 | Lo | |
| 11,271,712 | B2* | 3/2022 | Joergensen | ........... H04L 7/0079 |
| 11,424,901 | B2* | 8/2022 | Ran | ......................... H04L 12/40 |
| 2012/0250728 | A1 | 10/2012 | Pischl | |

FOREIGN PATENT DOCUMENTS

| CN | 111817928 A | 10/2020 |
| EP | 1 460 794 B1 | 3/2010 |
| EP | 2 343 807 A1 | 7/2011 |
| TW | 201204008 A1 | 1/2012 |

* cited by examiner

Primary Examiner — Chandrahas B Patel
(74) Attorney, Agent, or Firm — Winston Hsu

(57) ABSTRACT

A 100BASE-TX transceiver includes a receive (RX) circuit, a transmit (TX) circuit, a clock generator circuit, a clock and data recovery (CDR) circuit, and a clock multiplexer circuit. The RX circuit receives an input data to generate an RX data. The TX circuit transmits a TX data according to a TX clock, to generate an output data. The clock generator circuit generates an output clock. The CDR circuit generates an RX recovered clock according to the RX data. The clock multiplexer circuit receives the output clock and the RX recovered clock, and outputs the TX clock that is selected from the output clock and the RX recovered clock.

18 Claims, 5 Drawing Sheets

100BASE-TX TRANSCEIVER WITH TRANSMIT CLOCK SELECTED FROM OUTPUT CLOCK OF CLOCK GENERATOR CIRCUIT AND RECEIVE RECOVERED CLOCK OF CLOCK AND DATA RECOVERY CIRCUIT AND ASSOCIATED METHOD

CROSS REFERENCE TO RELATED APPLICATIONS

This application claims the benefit of U.S. Provisional Application No. 63/346,907, filed on May 30, 2022. The content of the application is incorporated herein by reference.

BACKGROUND OF THE INVENTION

1. Field of the Invention

The present invention relates to 100BASE-TX networking, and more particularly, to a 100BASE-TX transceiver with a transmit (TX) clock selected from an output clock of a clock generator circuit and a receive (RX) recovered clock of a clock and data recovery (CDR) circuit and an associated method.

2. Description of the Prior Art

100BASE-TX is the technical name of Fast Ethernet over twisted pair cables. It was launched as the Institute of Electrical and Electronics Engineers (IEEE) 802.3u standard in 1995. Specifically, 100BASE-TX is a Fast Ethernet standard for local area networks (LANs), where "100" refers to a maximum transmission speed of 100 Mbps, "BASE" refers to baseband signaling, "T" refers to twisted as in twisted-pair cabling, and "TX" means that the application is utilizing CAT5 cables, where two pairs of copper wires are being used to support the transmission speed of 100 Mbps. In accordance with the IEEE 802.3u-1995 standard, there is no clock synchronization scheme (e.g., master-slave clocking architecture) specified for a transmit (TX) clock used by the 100BASE-TX transmitter and a receive (RX) clock used by the 100BASE-TX receiver. That is, the 100BASE-TX specification doesn't specify using Auto-Negotiation (AN) to handshake. As a result, a 100BASE-TX device can't enable master-slave clocking architecture after the AN procedure. In the master-slave clocking architecture, the slave device will extract and track the clock in the received data sent from the master device and use the recovered clock to send the data to the master device. If there is no procedure to detect the master mode and the slave mode and both 100BASE-TX devices are forced to use the RX recovered clock as the TX clock, a link between the 100BASE-TX devices can't be established.

Thus, there is a need for an innovative 100BASE-TX transceiver design which is capable of detecting if a link partner uses an RX recovered clock as a TX clock and/or capable of controlling enablement of using an RX recovered clock as a TX clock, such that the TX clock can be properly set through clock multiplexing.

SUMMARY OF THE INVENTION

One of the objectives of the claimed invention is to provide a 100BASE-TX transceiver with a transmit (TX) clock selected from an output clock of a clock generator circuit and a receive (RX) recovered clock of a clock and data recovery (CDR) circuit and an associated method.

According to a first aspect of the present invention, an exemplary 100BASE-TX transceiver is disclosed. The exemplary 100BASE-TX transceiver includes a receive (RX) circuit, a transmit (TX) circuit, a clock generator circuit, a clock and data recovery (CDR) circuit, and a clock multiplexer circuit. The RX circuit is arranged to receive an input data to generate an RX data. The TX circuit is arranged to transmit a TX data according to a TX clock, to generate an output data. The clock generator circuit is arranged to generate an output clock. The CDR circuit is arranged to generate an RX recovered clock according to the RX data. The clock multiplexer circuit is arranged to receive the output clock and the RX recovered clock, and output the TX clock that is selected from the output clock and the RX recovered clock.

According to a second aspect of the present invention, an exemplary 100BASE-TX transceiving method is disclosed. The exemplary 100BASE-TX transceiving method includes: receiving an input data to generate a receive (RX) data; transmitting a transmit (TX) data according to a TX clock, to generate an output data; performing clock generation to generate an output clock; performing clock and data recovery (CDR) upon the RX data to generate an RX recovered clock; and performing clock multiplexing upon the output clock and the RX recovered clock to output the TX clock that is selected from the output clock and the RX recovered clock.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
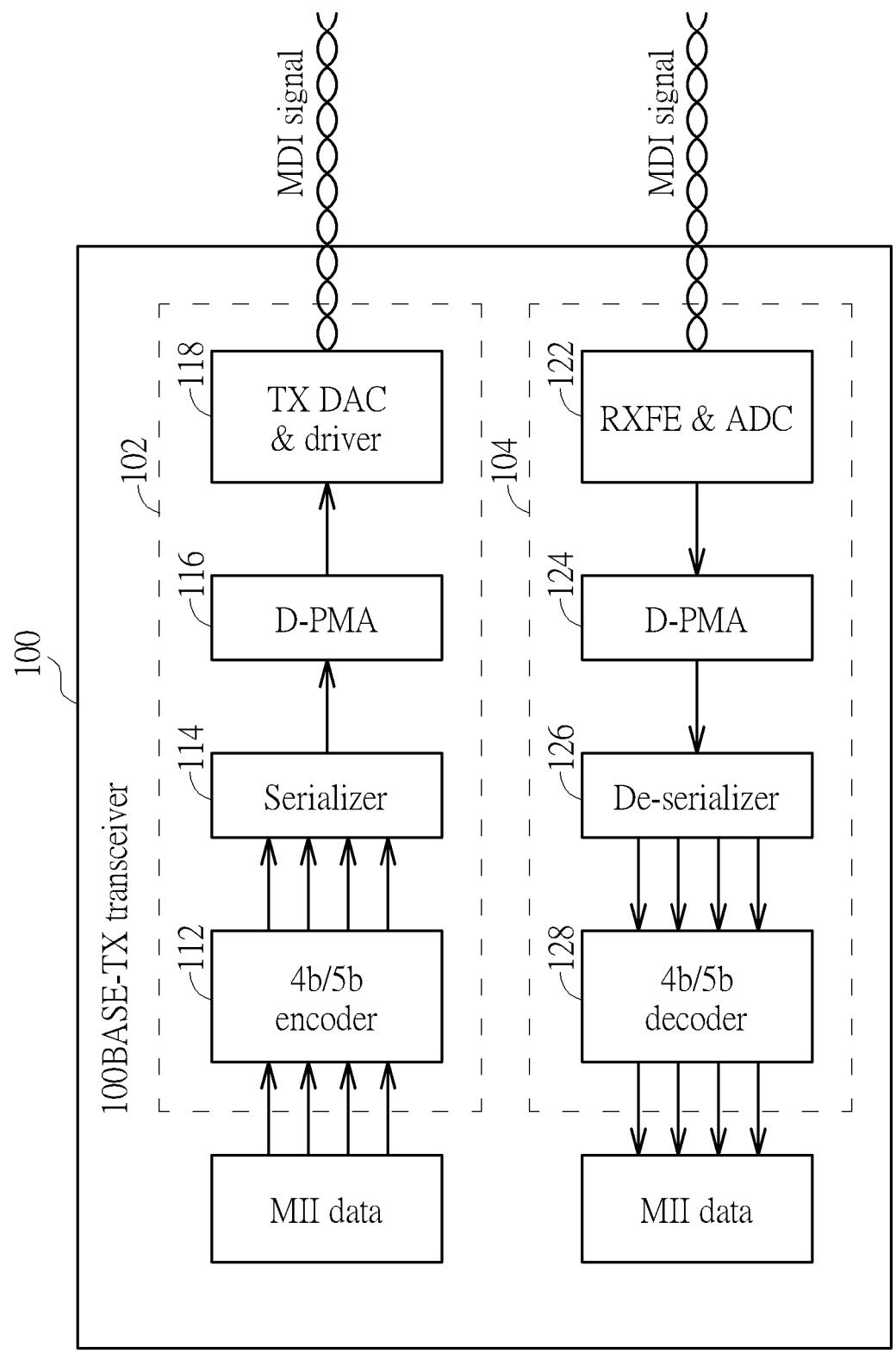
FIG. 1 is a diagram illustrating a 100BASE-TX transceiver according to an embodiment of the present invention.

FIG. 1 is a diagram illustrating a 100BASE-TX transceiver according to an embodiment of the present invention. The 100BASE-TX transceiver 100 may be regarded as a combination of a 100BASE-TX transmitter 102 and a 100BASE-TX receiver 104. The 100BASE-TX transmitter 102 includes a 4b/5b encoder circuit (labeled by "4b/5b encoder") 112, a serializer circuit (labeled by "serializer") 114, a digital front-end circuit (labeled by "D-PMA") 116, and a transmit (TX) digital-to-analog converter (DAC) and driver circuit (labeled by "TX DAC & driver") 118. The 100BASE-TX receiver 104 includes an RX front-end (RXFE) and analog-to-digital converter (ADC) circuit (labeled by "RXFE & ADC") 122, a digital front-end circuit (labeled by "D-PMA") 124, a de-serializer circuit (labeled by "De-serializer") 126, and a 4b/5b decoder circuit (labeled by "4b/5b decoder") 128. It should be noted that only the components pertinent to the present invention are shown in FIG. 1. In practice, the 100BASE-TX transmitter 102 may include additional components to achieve other functions, and/or the 100BASE-TX receiver 104 may include additional components to the achieve other functions.

The 100BASE-TX transmitter 102 receives medium independent interface (MII) data from a media access control (MAC) layer, and transmits a medium dependent interface (MDI) signal via a twisted-pair cable. The 100BASE-TX receiver 104 receives an MDI signal from a twisted-pair cable, and outputs MII data to the MAC layer. The major difference between the proposed 100BASE-TX transceiver 100 and a typical 100BASE-TX transceiver is that the digital front-end circuit 124 is configured to support a function of detecting if a link partner uses an RX recovered clock as a TX clock and/or a function of controlling enablement of using an RX recovered clock as a TX clock. Since the present invention is focused on additional functions associated with clock multiplexing for setting the TX clock, further description of fundamental principles of the 100BASE-TX transmitter 102 and the 100BASE-TX receiver 104 is omitted here for brevity.

Figure 2:
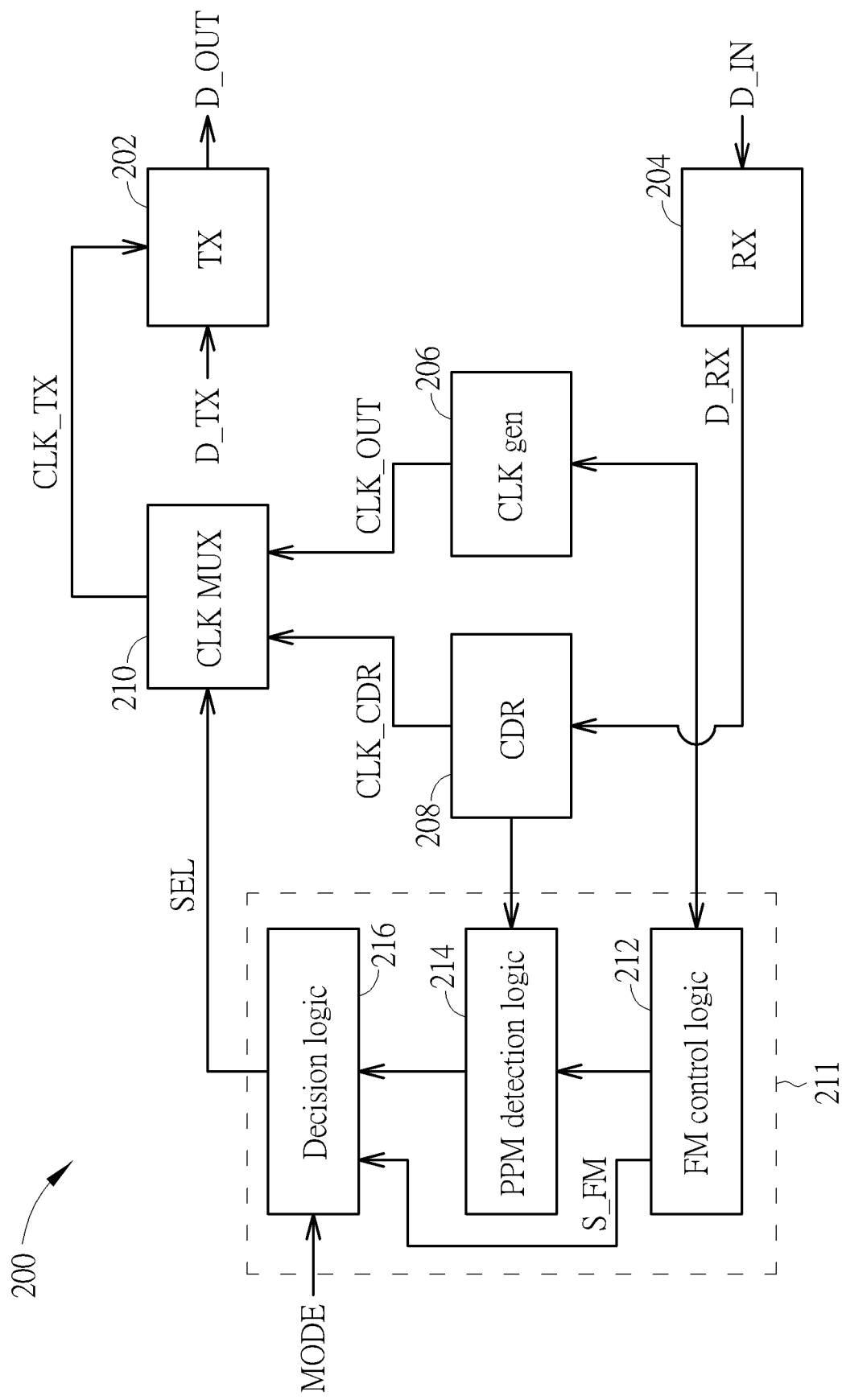
FIG. 2 is a diagram illustrating one implementation of a 100BASE-TX transceiver according to an embodiment of the present invention.

FIG. 2 is a diagram illustrating one implementation of a 100BASE-TX transceiver according to an embodiment of the present invention. It should be noted that only the components pertinent to the present invention are illustrated. For example, a part of the 100BASE-TX transceiver 100 in FIG. 1 may be implemented by the 100BASE-TX transceiver 200 shown in FIG. 2. The 100BASE-TX transceiver 200 may include a TX circuit (labeled by "TX") 202, an RX circuit (labeled by "RX") 204, a clock generator circuit (labeled by "CLK gen") 206, a clock and data recovery circuit (labeled by "CDR") 208, a clock multiplexer circuit (labeled by "CLK MUX") 210, and a control circuit 211. In this embodiment, the control circuit 211 may include a frequency modulation (FM) control logic 212, a parts per million (PPM) detection logic 214, and a decision logic 216. The RX circuit 204 is arranged to receive an input data D_IN to generate an RX data D_RX. For example, the input data D_IN may be an MDI signal received from a twisted-pair cable, and an input of the de-serializer circuit 126 shown in FIG. 1 may be derived from the RX data D_RX. The TX circuit 202 is arranged to transmit a TX data D_TX according to a TX clock CLK_TX, to generate an output data D OUT. For example, the TX data D_TX may be an output of the serializer circuit 114 shown in FIG. 1, and the output data D OUT may be an MDI signal transmitted via a twisted-pair cable.

The clock generator circuit 206 is arranged to generate an output clock CLK_OUT. In this embodiment, the clock generator circuit 206 may further support frequency modulation that can be enabled during a detection phase of a function of detecting if a link partner uses an RX recovered clock as a TX clock. In other words, when a frequency modulation function of the clock generator circuit 206 is enabled, the output clock CLK_OUT may have a variable clock frequency; and when the frequency modulation function of the clock generator circuit 206 is disabled, the output clock CLK_OUT may have a fixed clock frequency. The clock and data recovery (CDR) circuit 208 is arranged to generate an RX recovered clock CLK_CDR according to the RX data D_RX. It should be noted that any CDR technique capable of deriving the RX recovered clock CLK_CDR from the RX data D_RX may be employed by the CDR circuit 208. The clock multiplexer circuit 210 is arranged to receive the output clock CLK_OUT and the RX recovered clock CLK_CDR, and output the TX clock CLK_TX to the TX circuit 202, where the TX clock CLK_TX is selected from the output clock CLK_OUT and the RX recovered clock CLK_CDR. Specifically, clock multiplexing performed upon the output clock CLK_OUT and the RX recovered clock CLK_CDR is controlled by a selection control signal SEL that is set by the control circuit 211 (particularly, decision logic 216 of control circuit 211). In this embodiment, the control circuit 211 may control a function of detecting if a link partner uses an RX recovered clock as a TX clock and/or a function of controlling enablement of using an RX recovered clock as a TX clock. Specifically, the control circuit 211 operates according to a mode control signal MODE. The mode control signal MODE may be set by a user input. Based on the setting of the mode control signal MODE, the 100BASE-TX transceiver 200 may operate in Mode 1, Mode 2, or Mode 3. Further details of the function of detecting if a link partner uses an RX recovered clock as a TX clock and the function of controlling enablement of using an RX recovered clock as a TX clock are described with reference to the accompanying drawings.

Figure 3:
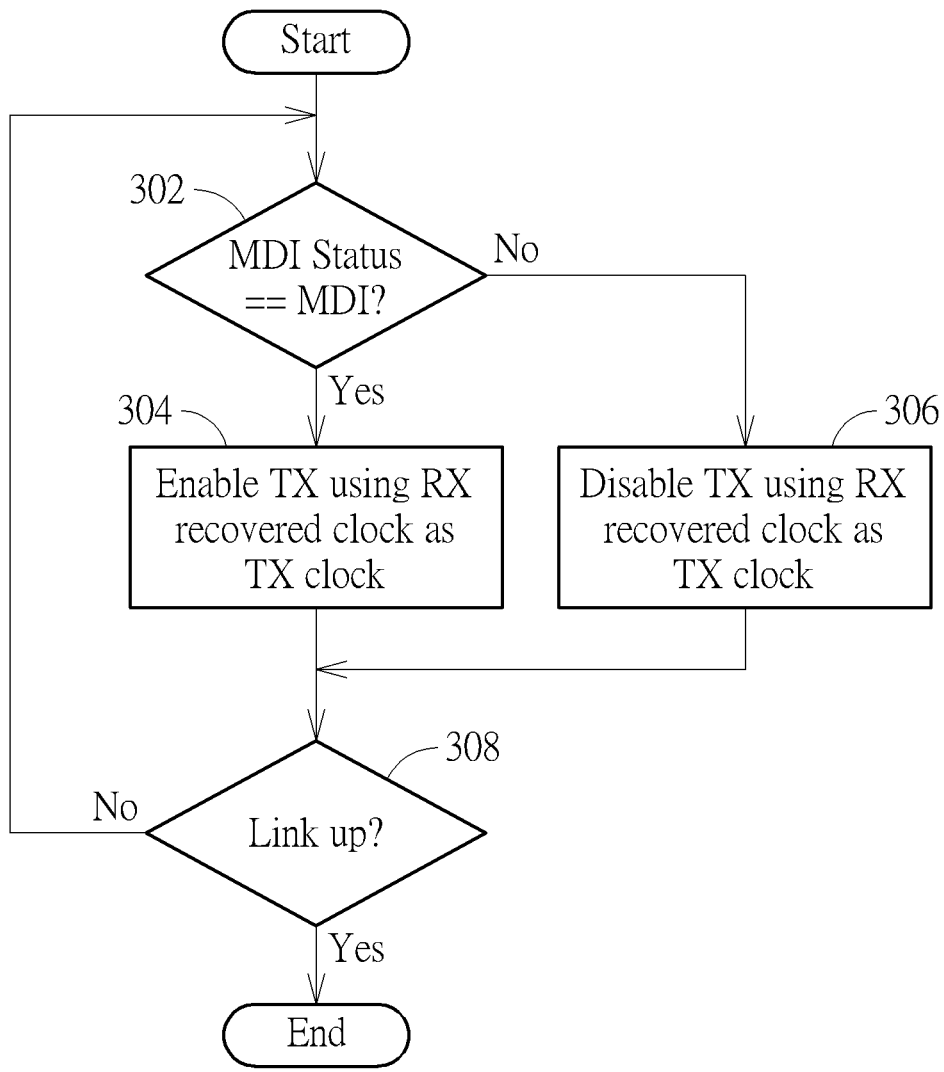
FIG. 3 is a flowchart illustrating a 100BASE-TX transceiving method under Mode 1 according to an embodiment of the present invention.

Please refer to FIG. 3 in conjunction with FIG. 2. FIG. 3 is a flowchart illustrating a 100BASE-TX transceiving method under Mode 1 according to an embodiment of the present invention. The 100BASE-TX transceiving method may be employed by the 100BASE-TX transceiver 100/200. Provided that the result is substantially the same, the steps are not required to be executed in the exact order shown in FIG. 3. When the mode control signal MODE is set by Mode 1 (MODE=Mode 1), the decision logic 216 is arranged to check a media independent interface (MDI) status of the 100BASE-TX transceiver 100/200 that is set by an Auto-Crossover function associated with an automatic media independent interface/media independent interface with crossover (MDI/MDIX) feature specified by the 100BASE-TX specification, and refer to the MDI status to set the selection control signal SEL of the clock multiplexer circuit 210. Before Auto-Negotiation is initiated between a 100BASE-TX device (which uses the 100BASE-TX transceiver 100/200) and a link partner, Auto-Crossover is initiated between the 100BASE-TX device (which uses the 100BASE-TX transceiver 100/200) and the link partner. The MDI status is a variable that defines the condition of the Automatic MDI/MDI-X physical connection, and can be available to the decision logic 216 after Auto-Crossover is completed.

The Auto-Crossover function is defined by IEEE 802.3 clause A brief description of the Auto-Crossover function is as follows.

The link topology of MDI requires a crossover function in a Data Terminal Equipment (DTE) to DTE connection. Eight-pin MDI connectors shall be used as the mechanical interface to the balanced cabling connector. The assignment of physical medium attachment (PMA) signals to the connector contacts is shown in the following table.

TABLE 1

| Contact | MDI | MDI-X |
|---|---|---|
| 1 | BI_DA+ | BI_DB+ |
| 2 | BI_DA− | BI_DB− |
| 3 | BI_DB+ | BI_DA+ |
| 4 | BI_DC+ | BI_DD+ |
| 5 | BI_DC− | BI_DD− |
| 6 | BI_DB− | BI_DA− |
| 7 | BI_DD+ | BI_DC+ |
| 8 | BI_DD− | BI_DC− |

The MDI Status is a variable that defines the condition of the Automatic MDI/MDI-X physical connection, and the MDI Status is set by one of the values: MDI and MDI-X. Automatic MDI/MDI-X configuration is intended to eliminate the need for crossover cables between similar devices.

An Automatic MDI/MDI-X state diagram facilitates switching the BI_DA(C)+ and BI_DA(C)− with the BI_DB (D)+ and BI_DB(D)− signals respectively prior to the auto-negotiation mode. The correct polarization of the crossover circuit is determined by an algorithm that controls the switching function. This algorithm uses an 11-bit linear feedback shift register (LFSR) to create a pseudo-random sequence that each end of the link uses to determine its proposed configuration. Upon making the selection to either MDI or MDI-X, the node waits for a specified amount of time while evaluating its receive channel to determine whether the other end of the link is sending link pulses or physical layer (PHY)-dependent data. If link pulses or PHY-dependent data are detected, it remains in that configuration. If link pulses or PHY-dependent data are not detected, it increments its LFSR and makes a decision to switch based on the value of the next bit. The state diagram does not move from one state to another while link pulses are being transmitted.

Although the automatic MDI/MDI-X configuration is not required for successful operation of 1000BASE-T, a crossover function must be implemented for every link segment to support the operation of Auto-Negotiation. The crossover function connects the transmitters of one PHY to the receivers of the PHY at the other end of the link segment. Crossover functions may be implemented internally to a PHY or elsewhere in the link segment. For a PHY that does not implement the crossover function, the MDI labels in the middle column of above Table 1 refer to its own internal circuits. For PHYs that do implement the internal crossover, the MDI labels in the last column of above Table 1 refer to the internal circuits of the remote PHY of the link segment.

When a link segment connects a single-port device to a multiport device, it is recommended that the crossover be implemented in the PHY local to the multiport device. If neither or both PHYs of a link segment contain internal crossover functions, an additional external crossover is necessary. It is recommended that the crossover be visible to an installer from one of the PHYs. When both PHYs contain internal crossovers, it is further recommended that, in networks in which the topology identifies either a central backbone segment or a central device, the PHY furthest from the central element be assigned the external crossover to maintain consistency.

The MDI status of the automatic MDI/MDIX feature may be written into a register, and the decision logic 216 can read the register to know the automatic MDI/MDIX result and use the automatic MDI/MDIX result for deciding the clock multiplexing setting. For example, when the MDI status of the 100BASE-TX transceiver 100/200 indicates that one of an MDI port and an MDIX port is used by the 100BASE-TX transceiver 100/200, the decision logic 216 sets the selection control signal SEL for instructing the clock multiplexer circuit 210 to output the output clock CLK_OUT as the TX clock CLK_TX; and when the MDI status of the 100BASE-TX transceiver 100/200 indicates that another of the MDI port and the MDIX port is used by the 100BASE-TX transceiver 100/200, the decision logic 216 sets the selection control signal SEL for instructing the clock multiplexer circuit 210 to output the RX recovered clock CLK_CDR as the TX clock CLK_TX. In this embodiments, both of 100BASE-TX devices employ the same transceiver architecture shown in FIG. 2 and thus support the same function of using an RX recovered clock as a TX clock, one of the 100BASE-TX devices (i.e., a master device) is ensured to select the output clock CLK_OUT as the TX clock CLK_TX under Mode 1, and another of the 100BASE-TX devices (i.e., a slave device) is ensured to select the RX recovered clock CLK_CDR as the TX clock CLK_TX under Mode 1. In this way, a link can be successfully established between two 100BASE-TX devices both supporting the function of using an RX recovered clock as a TX clock.

Regarding the example shown in FIG. 3, when the MDI status of the 100BASE-TX transceiver 100/200 indicates that an MDIX port is used by the 100BASE-TX transceiver 100/200 through the automatic MDI/MDIX feature (Step 302), it implies that an MDI port is used by the link partner that employs the same transceiver architecture shown in FIG. 2, and the link partner uses an RX recovered clock generated by CDR as a TX clock under Mode 1. The decision logic 216 sets the selection control signal SEL for instructing the clock multiplexer circuit 210 to output the output clock CLK_OUT, thereby preventing the TX circuit 202 from using the RX recovered clock CLK_CDR as the TX clock CLK_TX (Step 306). When the MDI status of the 100BASE-TX transceiver 100/200 indicates that an MDI port is used by the 100BASE-TX transceiver 100/200 through the automatic MDI/MDIX feature (Step 302), it implies that an MDIX port is used by the link partner that employs the same transceiver architecture shown in FIG. 2, and the link partner uses an output clock generated by non-CDR clock generation as a TX clock under Mode 1. The decision logic 216 sets the selection control signal SEL for instructing the clock multiplexer circuit 210 to output the RX recovered clock CLK_CDR, thereby allowing the TX circuit 202 to use the RX recovered clock CLK_CDR as the TX clock CLK_TX (Step 304). At step 308, it is checked to determine if link up at 100BASE-TX device with the link partner is successful. If yes, the flow ends. If no, the flow returns to step 302.

Figure 4:
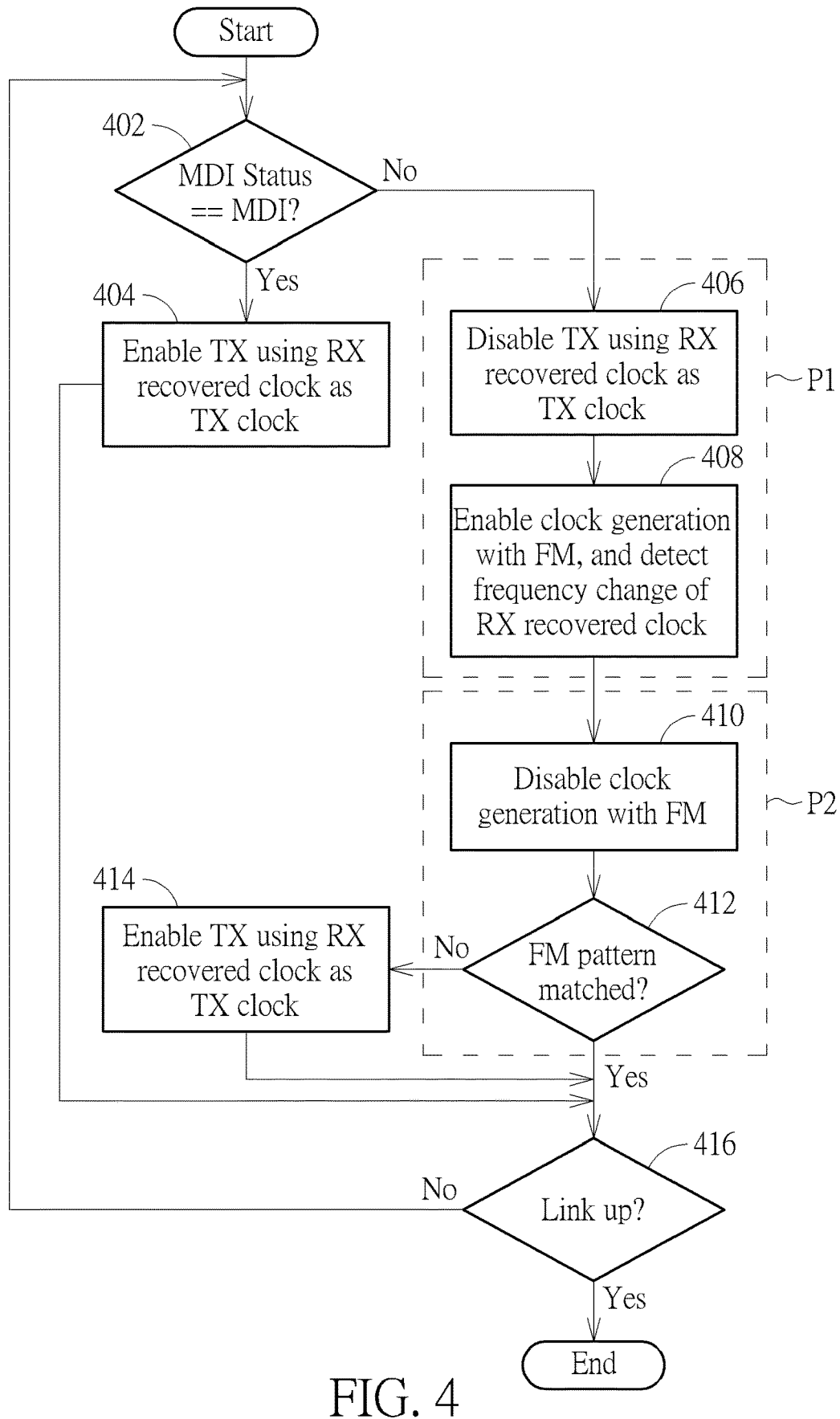
FIG. 4 is a flowchart illustrating a 100BASE-TX transceiving method under Mode 2 according to an embodiment of the present invention.

Please refer to FIG. 4 in conjunction with FIG. 2. FIG. 4 is a flowchart illustrating a 100BASE-TX transceiving method under Mode 2 according to an embodiment of the present invention. The 100BASE-TX transceiving method may be employed by the 100BASE-TX transceiver 100/200. Provided that the result is substantially the same, the steps are not required to be executed in the exact order shown in FIG. 4. When the mode control signal MODE is set by Mode 2 (MODE=Mode 2), the decision logic 216 is arranged to check an MDI status of the 100BASE-TX transceiver 100/200 that is set by an automatic MDI/MDIX feature specified by the 100BASE-TX specification, and refer to the MDI status to set the selection control signal SEL of the clock multiplexer circuit 210. The MDI status of the automatic MDI/MDIX feature may be written into a register, and the decision logic 216 can read the register to know the automatic MDI/MDIX result and use the automatic MDI/MDIX result as an initial condition for deciding the clock multiplexing setting. For example, when the MDI status of the 100BASE-TX transceiver 100/200 indicates that one of an MDI port and an MDIX port is used by the 100BASE-TX transceiver 100/200, the decision logic 216 sets the selection control signal SEL for instructing the clock multiplexer circuit 210 to output the output clock CLK_OUT as the TX clock CLK_TX; and when the MDI status of the 100BASE-TX transceiver 100/200 indicates that another of the MDI port and the MDIX port is used by the 100BASE-TX transceiver 100/200, the decision logic 216 sets the selection control signal SEL for instructing the clock multiplexer circuit 210 to output the RX recovered clock CLK_CDR as the TX clock CLK_TX. When the initial condition results in link-up failure due to the 100BASE-TX transceiver 100/200 using the RX recovered clock CLK_CDR as the TX clock CLK_TX, it is possible that the link partner may also enable a function of using an RX recovered clock as a TX clock. Hence, the control circuit 211 may enable a function of detecting if the link partner uses an RX recovered clock as a TX clock, for deciding whether a function of using an RX recovered clock as a TX clock should be disabled by the 100BASE-TX transceiver 100/200.

Regarding the example shown in FIG. 4, when the MDI status of the 100BASE-TX transceiver 100/200 indicates that an MDI port is used by the 100BASE-TX transceiver 100/200 through the automatic MDI/MDIX feature (Step 402), the decision logic 216 sets the selection control signal SEL for instructing the clock multiplexer circuit 210 to output the RX recovered clock CLK_CDR (Step 404). Next, it is checked to determine if link up at 100BASE-TX device with the link partner is successful (Step 416). If yes, it implies that the link partner does not support a function of using an RX recovered clock as a TX clock or does not enable a function of using an RX recovered clock as a TX clock, and can act as a master device. Hence, the flow ends. If no, it implies that the link partner may enable a function of using an RX recovered clock as a TX clock, and the flow returns to step 402. As described in the background section, if both 100BASE-TX devices are forced to use the RX recovered clock as the TX clock, a link between the 100BASE-TX devices can't be established due to both 100BASE-TX devices use slave clocks in the absence of a master clock. If the system works normally under a condition that the 100BASE-TX device (which uses the 100BASE-TX transceiver 100/200) is configured to use the RX recovered clock CLK_CDR as the TX clock CLK_TX, it implies that a TX clock used by the link partner must be independent of a RX recovered clock derived from a CDR circuit of the link partner. That is, if the system works normally under a condition that the 100BASE-TX device (which uses the 100BASE-TX transceiver 100/200) is configured to use a slave clock, it implies that the link partner uses a master clock.

According to the automatic MDI/MDIX feature specified by the 100BASE-TX specification, random selection between an MDI port and an MDIX port is performed. Hence, when the MDI status of the 100BASE-TX transceiver 100/200 indicates that an MDI port is used by the 100BASE-TX transceiver 100/200 after link-up failure at step 416, another link-up failure occurs, and the flow returns to step 402 again. Due to inherent characteristics of the automatic MDI/MDIX feature specified by the 100BASE-TX specification, steps 402, 404, and 406 will be repeatedly executed until an MDIX port is selected by the automatic MDI/MDIX feature.

When the MDI status of the 100BASE-TX transceiver 100/200 indicates that an MDIX port is used by the 100BASE-TX transceiver 100/200 through the automatic MDI/MDIX feature (Step 402), the 100BASE-TX transceiver 100/200 enables the function of detecting if the link partner uses an RX recovered clock as a TX clock. The decision logic 216 sets the selection control signal SEL for instructing the clock multiplexer circuit 210 to output the output clock CLK_OUT as the TX clock CLK_TX, thereby preventing the TX circuit 202 from using the RX recovered clock CLK_CDR as the TX clock CLK_TX (Step 406). Next, the FM control logic 212 is enabled to instruct the clock generator circuit 206 to generate the output clock CLK_OUT that is frequency modulated according to a pre-defined FM pattern S_FM, and the PPM detection logic 214 is arranged to detect frequency change of the RX recovered clock 208 that is obtained from the RX data D_RX by the CDR circuit 208 (Step 408). Consider a case where the link partner uses an RX recovered clock as a TX clock. Since the link-partner-side RX recovered clock is derived from performing a CDR operation upon an input data that is the output data D OUT generated and output from the 100BASE-TX device (which uses the 100BASE-TX transceiver 100/200) according to the device-side frequency-modulated TX clock CLK_TX, the link-partner-side RX recovered clock tracks the frequency variation of the device-side frequency-modulated TX clock CLK_TX due to inherent characteristics of the CDR operation. Similarly, since the device-side RX recovered clock CLK_CDR is derived from performing a CDR operation upon the input data D_IN that is an output data generated and output from the link partner according to the TX clock set by the link-partner-side RX recovered clock, the device-side RX recovered clock CLK_CDR tracks the frequency variation of the link-partner-side RX recovered clock (which tracks the frequency variation of the device-side frequency-modulated TX clock). Based on such observation, the PPM detection logic 214 can monitor the frequency variation of the device-side RX recovered clock CLK_CDR to determine if the link partner uses an RX recovered clock as a TX clock. That is, when the PPM detection logic 214 finds that the frequency of the RX recovered clock CLK_CDR changes with the frequency of the frequency-modulated TX clock CLK_TX, it can confirm that the link partner uses an RX recovered clock as a TX clock.

Specifically, during a detection phase P1, the clock multiplexer circuit 210 performs clock multiplexing upon the output clock CLK_OUT and the RX recovered clock CLK_CDR to select the output clock CLK_OUT as the TX clock CLK_TX, the clock generator circuit 206 performs non-CDR clock generation with frequency modulation to generate the output clock CLK_OUT (i.e., frequency-modulated clock), and the PPM detection logic 214 detects frequency change of the RX recovered clock 208.

At step 410, the FM control logic 212 is disabled, such that the clock generator circuit 206 generates the output clock CLK_OUT without frequency modulation (i.e., output clock CLK_OUT with a fixed clock frequency). Next, the decision logic 216 compares the frequency change of the RX recovered clock 208 (which is provided by the PPM detection logic 214) and the pre-defined FM pattern S_FM (which is provided by the FM control logic 212) to generate a comparison result. For example, the decision logic 216 may obtain the comparison result by cross-correlating the frequency change of the RX recovered clock and the pre-defined FM pattern S_FM. The comparison result indicates if the frequency-modulated output clock CLK_OUT is tracked at the link partner to act as the TX clock of the link partner. Hence, the decision logic 216 refers to the comparison result to set the selection control signal SEL of the clock multiplexer circuit 210. Specifically, during a decision phase P2 following the detection phase P1, the clock generator circuit 206 perform non-CDR clock generation without frequency modulation, and the decision logic 216 compares the frequency change of the RX recovered clock CLK_CDR with the pre-defined FM pattern for configuring the clock multiplexing setting.

When the comparison result indicates that the frequency change of the RX recovered clock CLK_CDR matches the pre-defined FM pattern S_FM (Step 412), it implies that the link partner uses an RX recovered clock as a TX clock and acts as a slave device. Hence, the decision logic 216 sets the selection control signal SEL (particularly, keeps the selection control signal SEL unchanged) for instructing the clock multiplexer circuit 206 to output the output clock CLK_OUT as the TX clock CLK_TX. In this way, the 100BASE-TX transceiver 100/200 acts as a master device. At step 416, it is checked to determine if link up at 100BASE-TX device with the link partner is successful. If yes, the flow ends. If no, the flow returns to step 402.

When the comparison result indicates that the frequency change of the RX recovered clock CLK_CDR does not match the pre-defined FM pattern S_FM (Step 412), it implies that the link partner does not support a function of using an RX recovered clock as a TX clock or does not enable a function of using an RX recovered clock as a TX clock, and acts as a master device. Hence, the decision logic 216 sets the selection control signal SEL for instructing the clock multiplexer circuit 206 to output the RX recovered clock CLK_CDR as the TX clock CLK_TX. In this way, the 100BASE-TX transceiver 100/200 acts as a slave device. At step 416, it is checked to determine if link up at 100BASE-TX device with the link partner is successful. If yes, the flow ends. If no, the flow returns to step 402.

To put it simply, the MDI status decides which of the output clock CLK_OUT and the RX recovered clock CLK_CDR is selected as the TX clock CLK_TX, and also decides if a function of detecting if a link partner uses an RX recovered clock as a TX clock should be enabled. In addition, Auto-Crossover is re-initiated for setting the MDI status each time a link-up failure occurs, where the MDI status may change (e.g., MDI→MDIX or MDIX→MDI) or may remain the same (e.g., MDI→MDI or MDIX→MDIX). In this embodiment shown in FIG. 4, the MDI status checked at step 402 allows the 100BASE-TX device (which uses the 100BASE-TX transceiver 100/200) to have a 50% chance to select the RX recovered clock CLK_CDR as the TX clock CLK_TX, and a 50% chance to select the output clock CLK_OUT as the TX clock CLK_TX and enable a function of detecting if the link partner uses an RX recovered clock as a TX clock. When link up at the 100BASE-TX device (which uses the 100BASE-TX transceiver 100/200) with the link partner is successful under a condition that the 100BASE-TX device (which uses the 100BASE-TX transceiver 100/200) uses the RX recovered clock CLK_CDR as the TX clock CLK_TX, it implies that the link partner does not use an RX recovered clock as a TX clock. When linkup at the 100BASE-TX device (which uses the 100BASE-TX transceiver 100/200) with the link partner is not successful under a condition that the 100BASE-TX device (which uses the 100BASE-TX transceiver 100/200) uses the RX recovered clock CLK_CDR as the TX clock CLK_TX, it implies that the link partner may use an RX recovered clock as a TX clock. When the 100BASE-TX device (which uses the 100BASE-TX transceiver 100/200) gets the chance to enable a function of detecting if the link partner uses an RX recovered clock as a TX clock, the detection result indicates if the current TX clock selection should be kept (i.e., CLK_TX=CLK_OUT, if frequency change of RX recovered clock is matched to FM pattern) or should be changed (i.e., CLK_TX=CLK_CDR, if frequency change of RX recovered clock is not matched to FM pattern).

As mentioned above, random selection between an MDI port and an MDIX port is performed according to the automatic MDI/MDIX feature specified by the 100BASE-TX specification. Hence, there is a fifty-fifty chance that the MDIX port is selected at step 402 after each link-up failure at step 416. To reduce the latency of enabling a function of detecting if a link partner uses an RX recovered clock as a TX clock, the flowchart shown in FIG. 4 may be properly modified. For example, the MDIX port may be forced to be selected (i.e., MDI status=MDIX) after link-up failure occurs under MDI status=MDI. This alternative design also falls within the scope of the present invention.

Figure 5:
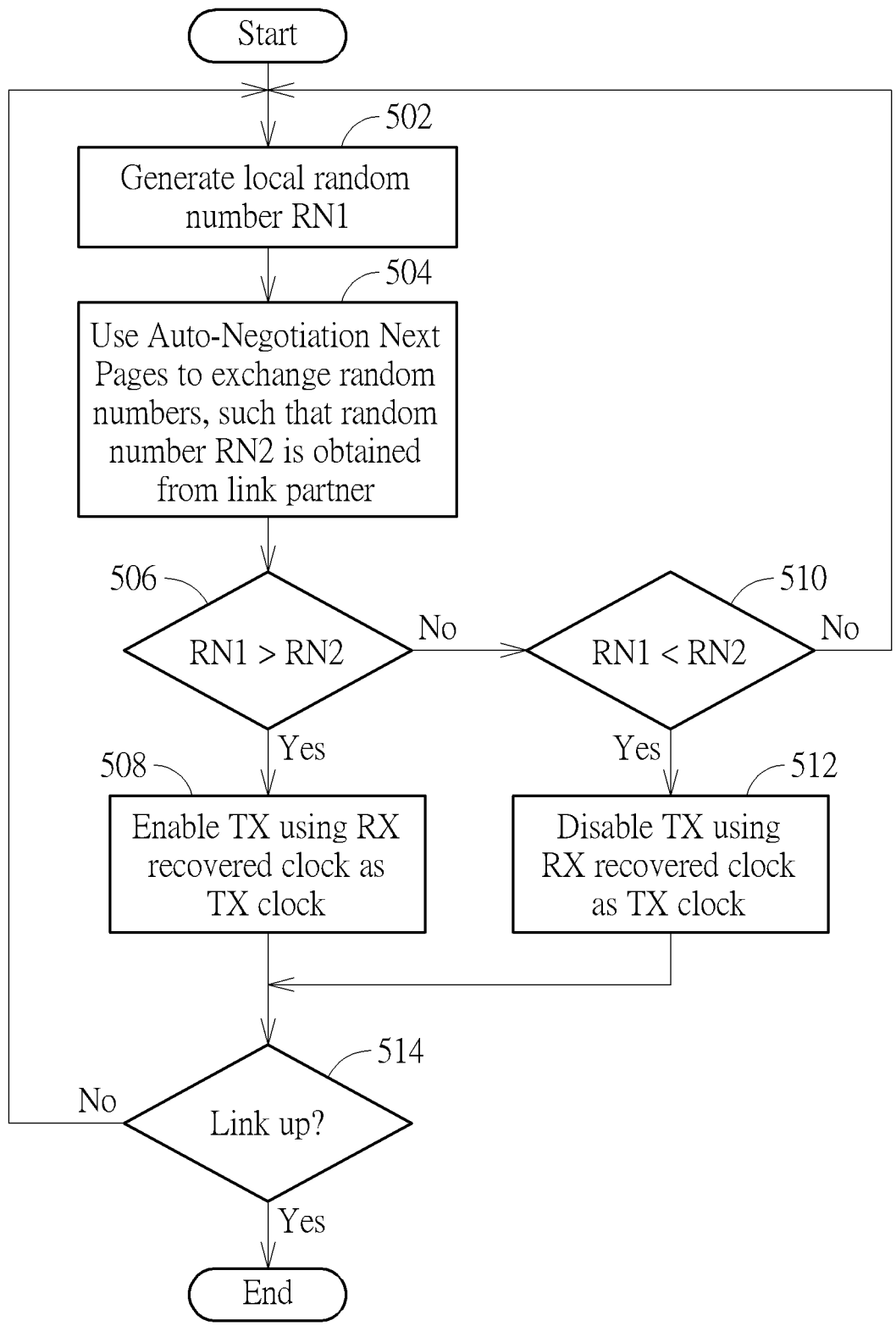
FIG. 5 is a flowchart illustrating a 100BASE-TX transceiving method under Mode 3 according to an embodiment of the present invention.

In above embodiments, the MDI status is checked to determine whether to enable a function of using an RX recovered clock as a TX clock. However, this is for illustrative purposes only, and is not meant to be a limitation of the present invention. Please refer to FIG. 5 in conjunction with FIG. 2. FIG. 5 is a flowchart illustrating a 100BASE-TX transceiving method under Mode 3 according to an embodiment of the present invention. The 100BASE-TX transceiving method may be employed by the 100BASE-TX transceiver 100/200. Provided that the result is substantially the same, the steps are not required to be executed in the exact order shown in FIG. 5. When the mode control signal MODE is set by Mode 3 (MODE=Mode 3), the decision logic 216 is arranged to generate a local random number RN1 (Step 502), and obtain a random number RN2 from a link partner (Step 504). In this embodiment, both of 100BASE-TX devices employ the same architecture shown in FIG. 2 and thus support the same function of using an RX recovered clock as a TX clock. In addition, each of the local random number RN1 and the random number RN2 obtained from the link partner may be one 11-bit random number, the local random number RN1 is further transmitted to the link partner through an Auto-Negotiation (AN) Next Page, and the random number RN2 generated at the link partner is obtained from the link partner through an AN Next Page. That is, AN Next Pages can be used to exchange random numbers between two 100BASE-TX devices (Step 504). The Next Page function is an optional feature to the AN capability. Next Pages are means by which network devices can transmit additional information beyond there link code words (i.e., Base Pages). After obtaining the random number RN2 generated from the link partner, the decision logic 216 compares the local random number RN1 and the random number RN2 obtained from the link partner to set the selection control signal SEL of the clock multiplexer circuit 210 (Step 506 and Step 510).

For example, when the local random number RN1 is smaller than the random number RN2 obtained from the link partner (i.e., RN1<RN2), the decision logic 216 sets the selection control signal SEL for instructing the clock multiplexer circuit 210 to output one of the output clock CLK_OUT and the RX recovered clock CLK_CDR as the TX clock CLK_TX; and when the local random number RN1 is larger than the random number RN2 obtained from the link partner (i.e., RN1>RN2), the decision logic 216 sets the selection control signal SEL for instructing the clock multiplexer circuit 210 to output another of the output clock CLK_OUT and the RX recovered clock CLK_CDR as the TX clock CLK_TX.

Regarding the example shown in FIG. 5, when the local random number RN1 is larger than the random number RN2 obtained from the link partner (Step 506), the decision logic 216 sets the selection control signal SEL for instructing the clock multiplexer circuit 210 to output the RX recovered clock CLK_CDR, thereby allowing the TX circuit 202 to use the RX recovered clock CLK_CDR as the TX clock CLK_TX (Step 508). Since AN Next Pages can be used to exchange random numbers between two 100BASE-TX devices (Step 504), the link partner uses an output clock generated by non-CDR clock generation as a TX clock. When the local random number RN1 is smaller than the random number RN2 obtained from the link partner (Step 510), the decision logic 216 sets the selection control signal SEL for instructing the clock multiplexer circuit 210 to output the output clock CLK_OUT, thereby preventing the TX circuit 202 from using the RX recovered clock CLK_CDR as the TX clock CLK_TX (Step 512). Since AN Next Pages can be used to exchange random numbers between two 100BASE-TX devices (Step 504), the link partner uses an RX recovered clock generated by CDR as a TX clock At step 514, it is checked to determine if linkup at 100BASE-TX device with the link partner is successful. If yes, the flow ends. If no, the flow returns to step 502 to restart an AN procedure between the 100BASE-TX transceiver 100/200 and the link partner. Furthermore, when the local random number RN1 is found equal to the random number RN2 obtained from the link partner (Step 510), the flow returns to step 502 to restart the AN procedure between the 100BASE-TX transceiver 100/200 and the link partner.

In a case where both of 100BASE-TX devices, including the 100BASE-TX transceiver 100/200 and the link partner, employ the same architecture shown in FIG. 2 and thus support the same function of using an RX recovered clock as a TX clock, one of the 100BASE-TX devices (i.e., a master device) is ensured to select the output clock CLK_OUT as the TX clock CLK_TX under Mode 3, and the other of the 100BASE-TX devices (i.e., a slave device) is ensured to select the RX recovered clock CLK_CDR as the TX clock CLK_TX under Mode 3. In this way, a link can be successfully established between the 100BASE-TX devices both supporting the function of using an RX recovered clock as a TX clock.

As mentioned above, the TX clock CLK_TX used by the TX circuit 202 can be set by the RX recovered clock CLK_CDR generated from the CDR circuit 208. For certain applications (e.g., long-distance transmission), an RX clock used by the RX circuit 204 may also be set by the RX recovered clock CLK_CDR. Since the TX clock is intentionally constrained to be in sync with the RX clock, implementing a noise reduction function in the 100BASE-TX transceiver 100/200 can be feasible. For example, the 100BASE-TX transceiver 100/200 can be modified to include a noise reduction circuit that is arranged to apply noise reduction to the RX data D_RX according to the TX data D_TX and the RX recovered clock CLK_CDR. For example, the noise reduction circuit may be a near-end crosstalk cancellation circuit that is arranged to apply near-end crosstalk cancellation to the RX data D_RX for reducing or mitigating the transmitter induced near-end crosstalk in the RX data D_RX.

In some embodiments of the present invention, when a 100BASE-TX device (which uses the 100BASE-TX transceiver 100/200) is configured to act as a master device with the TX clock CLK_TX set by the output clock CLK_OUT provided from the clock generator circuit 206, an RX clock used by the RX circuit 204 may be set by the RX recovered clock CLK_CDR provided from the CDR circuit 208 or the output clock CLK_OUT provided from the clock generator circuit (i.e., non-CDR circuit) 206, depending upon actual design considerations of RX architecture; and when the 100BASE-TX device (which uses the 100BASE-TX transceiver 100/200) is configured to act as a slave device with the TX clock CLK_TX set by the RX recovered clock CLK_CDR provided from the CDR circuit 208, the RX clock used by the RX circuit 204 may also be set by the RX recovered clock CLK_CDR provided from the CDR circuit 208. However, these are for illustrative purposes only, and are not meant to be limitations of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A 100BASE-TX transceiver comprising:
   a receive (RX) circuit, arranged to receive an input data to generate an RX data;
   a transmit (TX) circuit, arranged to transmit a TX data according to a TX clock, to generate an output data;
   a clock generator circuit, arranged to generate an output clock;
   a clock and data recovery (CDR) circuit, arranged to generate an RX recovered clock according to the RX data;
   a clock multiplexer circuit, arranged to receive the output clock and the RX recovered clock, and output the TX clock that is selected from the output clock and the RX recovered clock; and
   a decision logic, arranged to check a media independent interface (MDI) status of the 100BASE-TX transceiver that is set by an automatic media independent interface/media independent interface with crossover (MDI/MDIX) feature, and refer to the MDI status to set a selection control signal of the clock multiplexer circuit.

2. The 100BASE-TX transceiver of claim 1, wherein when the MDI status of the 100BASE-TX transceiver indicates that one of an MDI port and an MDIX port is used by the 100BASE-TX transceiver, the decision logic sets the selection control signal for instructing the clock multiplexer circuit to output the output clock as the TX clock; and when the MDI status of the 100BASE-TX transceiver indicates that another of the MDI port and the MDIX port is used by the 100BASE-TX transceiver, the decision logic sets the selection control signal for instructing the clock multiplexer circuit to output the RX recovered clock as the TX clock.

3. The 100BASE-TX transceiver of claim 1,
   wherein during a detection phase, the detection logic is further arranged to instruct the clock multiplexer circuit to output the output clock as the TX clock;

the 100BASE-TX transceiver further comprises:
a frequency modulation (FM) control logic, wherein during the detection phase, the FM control logic is enabled to instruct the clock generator circuit to generate the output clock that is frequency modulated according to a pre-defined FM pattern; and during a decision phase following the detection phase, the FM control logic is disabled; and
a detection logic, wherein during the detection phase, the detection logic is arranged to detect frequency change of the RX recovered clock;
wherein during the decision phase, the decision logic is further arranged to compare the frequency change of the RX recovered clock with the pre-defined FM pattern to generate a comparison result, and refer to the comparison result to set the selection control signal of the clock multiplexer circuit.

4. The 100BASE-TX transceiver of claim 3, wherein when the comparison result indicates that the frequency change of the RX recovered clock matches the pre-defined FM pattern, the decision logic sets the selection control signal for instructing the clock multiplexer circuit to output the output clock as the TX clock; and when the comparison result indicates that the frequency change of the RX recovered clock does not match the pre-defined FM pattern, the decision logic sets the selection control signal for instructing the clock multiplexer circuit to output the RX recovered clock as the TX clock.

5. A 100BASE-TX transceiver comprising:
a receive (RX) circuit, arranged to receive an input data to generate an RX data;
a transmit (TX) circuit, arranged to transmit a TX data according to a TX clock, to generate an output data;
a clock generator circuit, arranged to generate an output clock;
a clock and data recovery (CDR) circuit, arranged to generate an RX recovered clock according to the RX data;
a clock multiplexer circuit, arranged to receive the output clock and the RX recovered clock, and output the TX clock that is selected from the output clock and the RX recovered clock; and
a decision logic, arranged to generate a local random number, obtain a random number from a link partner, and compare the local random number with the random number obtained from the link partner to set a selection control signal of the clock multiplexer circuit.

6. The 100BASE-TX transceiver of claim 5, wherein the local random number is further transmitted to the link partner through an auto-negotiation (AN) Next Page.

7. The 100BASE-TX transceiver of claim 5, wherein when the local random number is smaller than the random number obtained from the link partner, the decision logic sets the selection control signal for instructing the clock multiplexer circuit to output one of the output clock and the RX recovered clock as the TX clock; and when the local random number is larger than the random number obtained from the link partner, the decision logic sets the selection control signal for instructing the clock multiplexer circuit to output another of the output clock and the RX recovered clock as the TX clock.

8. The 100BASE-TX transceiver of claim 5, wherein when the local random number is equal to the random number obtained from the link partner, an auto-negotiation (AN) between the 100BASE-TX transceiver and the link partner is restarted.

9. The 100BASE-TX transceiver of claim 5, wherein the random number is obtained from the link partner through an auto-negotiation (AN) Next Page.

10. A 100BASE-TX transceiving method comprising:
receiving an input data to generate a receive (RX) data;
transmitting a transmit (TX) data according to a TX clock, to generate an output data;
performing clock generation to generate an output clock;
performing clock and data recovery (CDR) upon the RX data to generate an RX recovered clock;
performing clock multiplexing upon the output clock and the RX recovered clock to output the TX clock that is selected from the output clock and the RX recovered clock; and
checking a media independent interface (MDI) status that is set by an automatic media independent interface/media independent interface with crossover (MDI/MDIX) feature, and referring to the MDI status to configure the clock multiplexing.

11. The 100BASE-TX transceiving method of claim 10, further comprising:
during a detection phase, performing the clock multiplexing to output the output clock as the TX clock, performing the clock generation to generate the output clock that is frequency modulated according to a pre-defined FM pattern, and detecting frequency change of the RX recovered clock; and
during a decision phase following the detection phase, performing the clock generation to generate the output clock that is not frequency modulated according to the pre-defined FM pattern, comparing the frequency change of the RX recovered clock with the pre-defined FM pattern to generate a comparison result, and referring to the comparison result to control the clock multiplexing.

12. The 100BASE-TX transceiving method of claim 11, wherein referring to the comparison result to control the clock multiplexing comprises:
in response to the comparison result indicating that the frequency change of the RX recovered clock matches the pre-defined FM pattern, configuring the clock multiplexing to output the output clock as the TX clock; and
in response to the comparison result indicating that the frequency change of the RX recovered clock does not match the pre-defined FM pattern, configuring the clock multiplexing to output the RX recovered clock as the TX clock.

13. The 100BASE-TX transceiving method of claim 10, wherein referring to the MDI status to configure the clock multiplexing comprises:
in response to the MDI status indicating that one of an MDI port and an MDIX port is used, configuring the clock multiplexing to output the output clock as the TX clock; and
in response to the MDI status indicating that another of the MDI port and the MDIX port is used, configuring the clock multiplexing to output the RX recovered clock as the TX clock.

14. A 100BASE-TX transceiving method comprising:
receiving an input data to generate a receive (RX) data;
transmitting a transmit (TX) data according to a TX clock, to generate an output data;
performing clock generation to generate an output clock;
performing clock and data recovery (CDR) upon the RX data to generate an RX recovered clock;

performing clock multiplexing upon the output clock and the RX recovered clock to output the TX clock that is selected from the output clock and the RX recovered clock; and generating a local random number;

obtaining a random number from a link partner; and comparing the local random number with the random number obtained from the link partner to configure the clock multiplexing.

15. The 100BASE-TX transceiving method of claim 14, wherein the random number is obtained from the link partner through an auto-negotiation (AN) Next Page.

16. The 100BASE-TX transceiving method of claim 14, wherein the local random number is further transmitted to the link partner through an auto-negotiation (AN) Next Page.

17. The 100BASE-TX transceiving method of claim 14, wherein comparing the local random number with the random number obtained from the link partner to configure the clock multiplexing comprises:

in response to the local random number being smaller than the random number obtained from the link partner, configuring the clock multiplexing to output one of the output clock and the RX recovered clock as the TX clock; and in response to the local random number being larger than the random number obtained from the link partner, configuring the clock multiplexing to output another of the output clock and the RX recovered clock as the TX clock.

18. The 100BASE-TX transceiving method of claim 14, wherein an auto-negotiation (AN) is restarted in response to the local random number being equal to the random number obtained from the link partner.

* * * * *